United States Patent [19]

Caillau et al.

[11] Patent Number: 4,836,855

[45] Date of Patent: Jun. 6, 1989

[54] ADDITIVE OF PROTEIN NATURE FOR HYDRAULIC CEMENTS, MORTARS & CONCRETES, AND USE THEREOF IN THE FIELD CONSTRUCTION

[75] Inventors: Pierre Caillau, Paris; Paul Mo gan, Bougival; Charles D. C. De Veauce, Target, all of France

[73] Assignee: ABC Bio-Industries, France

[21] Appl. No.: 175,673

[22] Filed: Mar. 25, 1988

Related U.S. Application Data

[63] Continuation of Ser. No. 29,211, Mar. 23, 1987, abandoned, which is a continuation of Ser. No. 876,006, Jun. 19, 1986, abandoned, which is a continuation of Ser. No. 649,315, Sep. 11, 1984, abandoned.

[51] Int. Cl.$^4$ ............................................. C04B 24/14
[52] U.S. Cl. ...................................... 106/91; 106/314; 435/68; 435/69; 435/220
[58] Field of Search ..................... 106/91, 314; 435/68, 435/69, 220

[56] References Cited

U.S. PATENT DOCUMENTS

| | | | |
|---|---|---|---|
| 396,355 | 5/1943 | Letters | 106/91 |
| 2,880,101 | 3/1959 | Ulfstedt | 106/91 |
| 3,536,507 | 10/1970 | Klein | 106/315 |
| 3,867,159 | 2/1975 | Eugene | 106/88 |
| 3,932,671 | 1/1976 | Yokotsuka et al. | 426/7 |

FOREIGN PATENT DOCUMENTS

| | | | |
|---|---|---|---|
| 58-181753 | 10/1983 | Japan | 106/93 |
| 621651 | 7/1978 | U.S.S.R. | 106/91 |
| 706366 | 12/1979 | U.S.S.R. | 106/91 |

*Primary Examiner*—William R. Dixon, Jr.
*Assistant Examiner*—Ann M. Knab
*Attorney, Agent, or Firm*—Bacon & Thomas

[57] ABSTRACT

The present invention relates to a novel additive for hydraulic cements, mortars and concretes, particularly for improving the mechanical strengths and the workability and for reducing sweating and segregation, which is characterized in that it is a protein hydrolysate having a pH less than or equal to 6, comprising substances selected from the group constituted by proteins, polypeptides, aminoacids and mixtures thereof, and obtained by treating 100 volumes of an aqueous composition containing at least one protein substance selected from the group constituted by proteins, polypeptides and mixtures thereof, with at least one bacterial strain producing lactic acid having a population greater than or equal to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

24 Claims, No Drawings

ADDITIVE OF PROTEIN NATURE FOR HYDRAULIC CEMENTS, MORTARS & CONCRETES, AND USE THEREOF IN THE FIELD CONSTRUCTION

This application is a continuation of application Ser. No. 029,211, filed Mar. 23, 1987, abandoned, which is a continuation of application Ser. No. 876,006, filed June 19, 1986, abandoned, which is a continuation of Ser. No. 649,315, filed Sept. 11, 1984, abandoned.

The present invention relates to a novel additive of protein nature, for hydraulic cements, mortars and concretes. It also relates to the use of this additive in the field of construction.

The expression "protein substance" or "substance of protein nature" is understood in the following specification to mean any product belonging to the group constituted by proteins, polypeptides and mixtures thereof; and the expression "protein hydrolysate" is understood to mean any product belonging to the group constituted by proteins, polypeptides, aminoacids and mixtures thereof.

It has already been recommended to use proteins in the building field, particularly for making cellular concretes and light colloidal concretes. According to the indications given in KEITEL's work "Zement: Herstellung und Eigenschaften", Springer-Verlag Berlin-Heidelberg-New York 1971, page 186, lines 38-40, it is thought that the ancient Romans used animal blood in the manufacture of porous concrete. However, the use of proteins raises difficulties in the building field by inducing delays in setting, as indicated by JOISEL in "Adjuvant du ciment", Editions Star, Paris 1965, pages 45 and 105.

Furthermore, it is known from U.S. Pat. No. 4,203,674, which recommends using blood in powder form as air-entraining colloid in association with another colloid (in particular hydroxyethylcellulose, hydroxypropylmethylcellulose and carboxymethylcellulose) to obtain lightened concretes and mortars, that liquid blood is not suitable for making said lightened concretes and mortars.

The invention recommends a novel technical solution for improving the mechanical strengths (particularly the tensile, bending and compressive strengths), for reducing sweating and segregation, and finally for improving the workability of the hydraulic cements, concretes and mortars. This novel technical solution which favourably modifies a certain number of rheological parameters, employs liquid protein hydrolysates which differ from the additives heretofore known in the building domain.

The protein additive recommended according to the invention for improving the mechanical properties, the workability and for reducing sweating and segregation of the hydraulic cements, concretes and mortars, is characterized in that it is a protein hydrolysate having a pH less than or equal to 6, comprising substances selected from the group constituted by proteins, polypeptides, aminoacids and mixtures thereof, and obtained by treating 100 parts by weight of an aqueous composition containing at least one protein substance selected from the group constituted by proteins, polypeptides and mixtures thereof, with at least one bacterial strain producing lactic acid having a population greater than or equal to $10^2$ germs/cm$^3$, in the presence of 0.5 to 30 parts by weight of a source of carbon belonging to the family of carbohydrates, for at least 2 hours, at a temperature of between 0 and 65° C. and at a pH less than or equal to 6.

The protein hydrolysate useful according to the invention in the construction domain may be used directly in the liquid or humid state. Before being associated with a hydraulic cement and with water, or as the case may be, with a hydraulic cement, water with sand and/or granulates, it may be conserved in a suitable recipient for at least 18 months at a temperature of between −5° and +60° C.

The protein additive according to the invention differs, by the mode by which it is obtained, from the means recommended by German Pat. No. 511 513 on the one hand and the summary of Chemical Abstracts 88, 140 835 t, on the other hand.

Among suitable protein hydrolysates, particular mention may be made of those obtained from animal or plant proteins. Among these proteins, mention may be made of proteins of animal origin such as meat product proteins, offal product proteins, milk proteins, whole fish proteins, fish wastes, albumins (particularly egg albumin), and plant proteins such as those contained in the Leguminosae, oleaginous plants, Solanaceae (particularly tobacco) and algae.

Protein substances which are suitable for obtaining the hydrolysate according to the invention are in particular the animal and plant proteins mentioned above as well as the hydrolysates and proteolysates of said animal and plant proteins which comprise, in particular, either proteins which have not yet broken down, or polypeptides, or mixtures of proteins an polypeptides, in association, as the case may be, with aminoacids.

The ground meat product proteins or the ground or liquid offal product proteins are advantageously rapidly subjected to treatment with bacteria producing lactic acid. Before such treatment, especially if it is delayed, it is recommended to associate with the protein substances 1 to 15% by weight of crushed cereals.

The following bacteria producing lactic acid may be used in the preparation of the hydrolysate useful according to the invention as additive in the construction domain: Streptococcus (particularly *Streptococcus bovis, Streptococcus thermophilus, Streptococcus faecalis, Streptococcus faecium, Streptococcus cremoris, Streptococcus lactis*), Leuconostoc (particularly *Leuconostoc mesenteroides, Leuconostoc lactis, Leuconostoc cremoris*) and Lactobacillus (particularly *Lactobacillus delbrueckii, Lactobacillus leichmanii, Lactobacillus jensenii, Lactobacillus lactis, Lactobacillus bulgaricus, Lactobacillus helveticus, Lactobacillus acidophilus, Lactobacillus casei, Lactobacillus plantarum*). Among suitable strains, particular mention may be made of the strains of the Collection of the Pasteur Institute: *Streptococcus bovis* 56.23, *Streptococcus thermophilus* 66.31, *Streptococcus faecalis* 54.32, *Streptococcus faecium* 54.31, *Streptococcus lactis* 70.57, *Leuconostoc mesenteroides* 53.49, *Lactobacillus delbrueckii* 57.8, *Lactobacillus leichmanii* 53.61, 53.3 and 53.4, *Lactobacillus jensenii* 69.17, *Lactobacillus bulgaricus* 71.36, *Lactobacillus helveticus* 57.15, *Lactobacillus acidophilus* 76.13 and 71.34, *Lactobacillus casei* 71.37, 71.38 and A 158, *Lactobacillus plantarum* 71.39, and the strain of the catalogue of the American Type Culture Collection: *Lactobacillus lactis* ATCC 8000.

According to the invention, one or more strains of lactic acid-producing bacteria will be used. The bacterial population will be between $10^2$ germs/cm$^3$ and $10^8$ germs/cm$^3$, and advantageously between 10$^3$ germs/cm$^3$ and 10$^6$ germs/cm$^3$.

The total content of protein substance and aminoacid contained in the liquid protein hydrolysate according to the invention is between 0.5 and 50% weight/volume. If necessary, the protein hydrolysate may be concentrated in vacuo and/or sterilized.

The carbohydrates used as source of carbon may be hydrolyzable or non-hydrolyzable, the preferred carbohydrates being in particular glucose, lactose, saccharose, maltose, water-soluble starch and whey.

It is possible to select the or each bacterial strain which may be used according to the invention by referring on the one hand to the intrinsic stability of the liquid protein hydrolysate obtained and on the other hand to a test of use which may be described as follows:

Two concretes A and B, of the following composition, are made:

|  | A | B |
| --- | --- | --- |
| cement of CP5 45 type with fillers | 400 g | 400 g |
| lime, type HA | 40 g | 40 g |
| light granulate (polystyrene, 1 to 5 mm diameter) | 2 l | 2 l |
| additive | 0 | 22 g |

The role of the additive according to the invention added to concrete B will be a densification of said concrete equivalent to at least 10 per cent of entrained air.

According to the invention, a process for manufacturing a construction element from a hydraulic cement, water and a liquid protein additive is recommended, whereby 100 parts by weight of hydraulic cement are mixed with 0.001 to 10 parts by weight of liquid protein additive previously diluted with mixing water. 20 to 50 parts by weight of mixing water for 100 parts by weight of hydraulic cement will advantageously be used.

According to this process, sand and/or granulates, which may be light and possibly expanded (polystyrene balls, glass balls, mica, vermiculite) or heavy depending on the desired density of the construction material, may also be introduced.

Four types of material may be obtained by the process of the invention, namely:
material A, from
 100 parts by weight of hydraulic cement, and
 0.001 to 10 parts by weight of protein additive;
material B, from
 100 parts by weight of hydraulic cement,
 0.001 to 10 parts by weight of protein additive, and
 1 to 9000 parts by weight of sand;
material C, from
 100 parts by weight of hydraulic cement,
 0.001 to 10 parts by weight of protein additive, and
 1 to 90000 parts by weight of granulates; and
material D, from
 100 parts by weight of hydraulic cement,
 0.001 to 10 parts by weight of protein additive,
 1 to 9000 parts by weight of sand, and
 11 to 90000 parts by weight of granulates.

The best embodiment of the invention consists, to obtain a construction material, in mixing 100 parts by weight of hydraulic cement (particularly cement or blast furnace slag) with 0.001 to 10 parts by weight of protein additive previously diluted in, preferably, 30 to 35 parts by weight of water with, as the case may be, sand and/or light or heavy granulates, the protein additive being obtained from liquid animal blood which is one of the elements of offal. The fresh animal blood which is collected at the abattoir must have an anti-coagulant added thereto (particularly an anti-coagulant selected from the group constituted by the alkali metal citrates, polyphosphates, heparin and silicones) within the five minutes following bleeding. 0.05 to 1 part by dry weight of anti-coagulant will advantageously be incorporated with 100 parts by weight of fresh liquid blood, treatment with the bacteria producing lactic acid being carried out at the latest 6 hours after bleeding.

It is unnecessary to employ a particular mixer as indicated in U.S. Pat. No. 4,203,674 mentioned above, the cement is mixed with mixing water containing the protein additive, then, as the case may be, sand and/or granulates, in a conventional mixer operating at 50–100 rpm.

Other advantages and features of the invention will be more readily understood on reading the following description of embodiments which are in no way limiting but given by way of illustration.

EXAMPLE 1

Concrete incorporating light granulates

A concrete is prepared from the following ingredients:

| | |
| --- | --- |
| hydraulic cement | 250 parts by weight |
| sand having particles with a diameter smaller than or equal to 0.8 mm | 50 parts by weight |
| light granulates (polystyrene balls) | 10 parts by weight |
| liquid protein additive (hydrolysate of beef blood having a total content of proteins, polypeptides and aminoacids included between 15 and 20% weight/volume) | 10 parts by weight |
| mixing water | 80 parts by weight |

The cement is homogenized (30 minutes), the mixing water containing the protein additive (30 seconds), the sand and the granulates are added, then mixed for 60 to 120 seconds in a mixer operating from 100 to 60 rpm.

The concrete thus obtained may then be compacted, vibrated, then immediately removed from the mould to obtain prefabricated articles, or directly positioned after pumping, cold extrusion or projection on site.

After conservation in a damp atmosphere (100% RH) at 20° C. for 7 days, this concrete presents an apparent density (MVA) of 400 kg/m$^3$, and (according to the measurements made on test pieces measuring 28 cm ×7 cm ×7 cm) a tensile-bending strength (TF) of 7×10$^5$ at 10$^6$ pascals and a compressive strength (RC) of 1.4×10$^6$ at 2.5×10$^6$ pascals.

By comparison, the concrete obtained by replacing the 10 parts by weight of protein additive by 10 parts by weight of water, gives, under the same conditions:
 MVA:350 kg/m$^3$
 TF:5×10$^4$ at 2×10$^5$ pascals
 RC:2×10$^5$ at 4×10$^5$ pascals.

EXAMPLE 2

Concrete incorporating heavy granulates

A concrete is obtained by proceeding as indicated in Example 1, from the following ingredients:

| | |
| --- | --- |
| hydraulic cement | 260 parts by weight |

-continued

| | |
|---|---|
| gravel (having particles with a diameter of between 3 and 8 mm) | 1400 parts by weight |
| sand | 50 parts by weight |
| liquid protein additive (hydrolysate of beef blood having a total content of proteins, polypeptides and aminoacids of 15 to 20% weight/volume) | 10 parts by weight |
| water | 80 parts by weight |

This concrete, after conservation in a humid atmosphere (100% RH) at 20° C. for 7 days, as indicated in Example 1, presents the following properties:

MVA:1800 kg/m$^3$
TF:2.3×10$^6$ pascals
RC:9.7×10$^6$ pascals

On the other hand, the product obtained by replacing the 10 parts by weight of protein additive by 10 parts by weight of water presents, under the same conditions, the following properties:

MVA:1800 kg/m$^3$
TF:1.6×10$^6$ pascals
RC:7.8×10$^6$ pascals.

The tests carried out with the construction materials obtained according to the invention with the protein additive coming from blood or another source of protein show that said additive possesses a thickening power, a gelling power and an emulsifying power.

As far as the thickening power is concerned, it is observed that the protein additive according to the invention is capable of binding a certain quantity of water with a force which is the greater as it is in intimate association therewith. This capacity to retain water brings about an expansion of the molecules of the protein additive, at the origin of an increase in the viscosity.

As far as the gelling power is concerned, it is observed that the protein additive, under the effect of setting of the hydraulic cements, forms a three-dimensional matrix containing in its meshes the components of the construction material.

Concerning the emulsifying power, a lowering of the interfacial tension which exists between two non-miscible faces such as fat and water, is observed. The macromolecules and the protein additive presenting a lipophilic pole and a hydrophilic pole are placed essentially at the interfaces of the drops. The hydrophilic pole in the water and the lipophilic pole in the fat group together to form air bubbles. This results in a rearranement which reduces or eliminates the interfacial tension.

The construction materials according to the invention are useful in particular in the manufacture of numerous articles of construction. The light concrete of Example 1 is particularly advantageous in the manufacture of bridge floors, it makes it possible to decrease the weight of the metallic structure, to ensure a better distribution of the overloads and, due to its insulating properties, to limit conduction of vibrations.

In the domain of highways and motorways, the concrete of Example 1 makes it possible simultaneously (i) to ensure good protection with respect to the frost/thaw cycles, and (ii) to reduce the depth of the foundations. According to conventional techniques, a highway with dense traffic comprises, from top to bottom:

a layer of surfacing of 5 cm,
a bituminous layer of 18.5 cm,
a supporting layer of rolled granulates of 15 cm,
an aerated layer for protection against frost of 45 cm, and
a so-called foundation layer of 20 cm.

With the concrete of Example 1, the total thickness has advantageously been reduced by replacing the supporting layer of rolled granulates and the frost-protection layer by one single layer of concrete of 22 cm, whilst giving the same protection with respect to the frost/thaw cycles.

The concretes according to the invention are also useful in the preparation of hollow gauged bricks, noggings, roof slabs, prefabricated partitions and smoke flues.

By way of information, a mode of preparing the hydrolysate (stabilized protein) which may be used according to the invention will be described hereinafter:

100 liters of beef blood (collected from healthy animals) have 600 g of sodium citrate (anti-coagulant) added thereto within the 5 minutes following bleeding. This blood is then treated (within the 3 hours following bleeding) with lactic acid-producing bacteria (mixture of *Streptococcus lactis, Leuconostoc mesenteroides* and *Lactobacillus casei*) so that the bacterial population in the resulting medium is at least 10$^5$ germs/cm$^3$, and 10 kg of carbohydrate (water-soluble starch), for 24 hours at 28° C., the pH of the resultant medium always being less than 6 (as lactic acid is formed, the pH stabilizes at about 4.7).

Analysis of this hydrolysate conserved for 15 months, at a temperature of between 15 and 20° C. and at a pH of about 4.7, gives the following results shown in Table I hereinafter with a total content of aminated nitrogen of 2.58%.

TABLE I

| Components | Composition in g/per 100 g of protein hydrolysate |
|---|---|
| Aspartic acid | 2.22 |
| Threonine | 1.08 |
| Serine | 1.13 |
| Glutamic acid | 2.01 |
| Proline | 0.839 |
| Glycine | 0.978 |
| Alanine | 1.67 |
| Valine | 1.78 |
| Cystine | 0.313 |
| Methionine | 0.309 |
| Isoleucine | 0.196 |
| Leucine | 2.30 |
| tyrosine | 0.635 |
| Phenylalanine | 1.36 |
| Lysine | 1.91 |
| Histidine | 1.20 |
| Arginine | 0.767 |
| Tryptophane | 0.279 |
| NH$_3$ after hydrolysis (6 N HCl) | 0.114 |

What is claimed is:

1. A protein additive for hydraulic cements, mortars and concretes, useful for improving the mechanical properties and the workability and for reducing sweating and segregation, wherein the additive is a protein hydrolysate obtained from fresh protein, said hydrolysate having a pH less than or equal to 6, comprising substances selected from the group consisting of proteins, polypeptides, aminoacids and mixtures thereof, and obtained by treating 100 volumes of an aqueous composition containing at least one fresh protein substance selected from the group constituted by proteins, polypeptides and mixtures thereof, with at least one bacterial strain producing lactic acid having a population greater than or equal to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

2. The additive of claim 1, wherein the fresh protein substance used as raw material subjected to the treatment with at least one strain of lactic acid-producing bacteria is selected from meat product proteins, offal product proteins, milk proteins, whole fish proteins, fish waste proteins, albumins, proteins of Leguminosae, oleaginous plants, Solanaceae and of algae.

3. The additive of claim 2 wherein the fresh protein is a meat product protein.

4. The additive of claim 2 wherein the fresh protein is an offal product protein.

5. The additive of claim 2 wherein the fresh protein is a milk product protein.

6. The additive of claim 2 wherein the fresh protein is a whole fish protein.

7. The additive of claim 2 wherein the fresh protein is fish waste protein.

8. The additive of claim 2 wherein the fresh protein is albumin.

9. The additive of claim 2 wherein the fresh protein is a protein of Leguminosae.

10. The additive of claim 2 wherein the fresh protein is an oleaginous protein.

11. The additive of claim 2 wherein the fresh protein is a Solanaceae.

12. The additive of claim 2 wherein the fresh protein is algae.

13. A protein additive for hydraulic cements, mortars and concretes, useful for improving the mechanical properties and the workability and for reducing sweating and segregation, wherein it is a protein hydrolysate obtained from fresh protein, said hydrolysate having a pH less than or equal to 6, comprising substances selected from the group constituted by proteins, polypeptides, aminoacids and mixtures thereof, and obtained by treating 100 volumes of an aqueous composition containing at least one fresh protein substance constituted by liquid animal blood to which an anticoagulant is added, the other offal proteins, meat product proteins, whole fish proteins, fish waste proteins and mixtures thereof, with at least one bacterial strain producing lactic acid having a population greater than or equal to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

14. A protein additive for hydraulic cements, mortars and concretes, useful for improving the mechanical properties and the workability and for reducing sweating and segregation, wherein it is a protein hydrolysate obtained from fresh protein, said hydrolysate having a pH less than or equal to 6, comprising substances selected from the group constituted by proteins, polypeptides, aminoacids and mixtures thereof, and obtained by treating 100 volumes of an aqueous composition containing at least one fresh protein substance constituted by liquid animal blood to which an anticoagulant is added, with at least one bacterial strain producing lactic acid having a population greater than or equal to to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

15. The additive of claim 14, wherein the protein substance contains 0.05 to 1 part by dry weight of anticoagulant to 100 parts by weight of liquid animal blood.

16. A process for manufacturing a construction element from a hydraulic cement and a protein additive comprising the step of mixing 100 parts by weight of hydraulic cement with 0.001 to 10 parts by weight of a protein additive which is a protein hydrolysate obtained from fresh protein, said hydrolysate having a pH less than or equal to 6, comprising substances selected from the group consisting of proteins, polypeptides, aminoacids and mixtures thereof, and obtained by treating 100 volumes of an aqueous composition containing at least one fresh protein substance selected from the group consisting of proteins, polypeptides and mixtures thereof, with at least one bacterial strain producing lactic acid having a population greater than or equal to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

17. The process of claim 16, wherein the fresh protein substance used as raw material subjected to the treatment with at least one strain of lactic acid-producing bacteria is selected from mean product proteins, offal product proteins, milk proteins, whole fish proteins, fish waste proteins, albumins, proteins of Leguminosae, oleaginous plants, Solanaceae and of algae.

18. The process of claim 16, wherein the protein hydrolysate has a pH less than or equal to 6, comprising substances selected from the group consisting of proteins, polypeptides, aminoacids and mixtures thereof, and obtained by treating 100 volumes of an aqueous composition containing at least one fresh protein substance from liquid animal blood to which an anticoagulant is added, offal proteins, meat product proteins, whole fish proteins, fish waste proteins and mixtures thereof, with at least one bacterial strain producting lactic acid having a population greater than or equal to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

19. The process of claim 16, wherein the protein hydrolysate has a pH less than or equal to 6, comprising substances selected from the group constituted by proteins, polypeptides, aminoacids and mixtures thereof, and obtained by treating 100 volumes of an aqueous composition containing at least one protein substance constituted by fresh liquid animal blood to which an anticoagulant is added, with at least one bacterial strain producing lactic acid having a population greater than or equal to $10^2$ germs/cm$^3$, in the presence of 0.5 to 30 parts by weight of a source of carbon belonging to the family of carbohydrates, for at least 2 hours, at a temperature of between 0° and 65° C. and at a pH less than or equal to 6.

20. The process of claim 19, wherein the protein substance contains 0.05 to 1 part by dry weight of anticoagulant for 100 parts by weight of liquid animal blood.

21. The process of claim 16, further including adding 1 to 9000 parts by weight of said to the hydraulic cement and protein additive.

22. The process of claim 16, further including adding 1 to 9000 parts by weight of granulates to the hydraulic cement and protein additive.

23. The process of claim 16, further including adding 11 to 9000 parts by weight of sand, and 1 to 9000 parts by weight of granulates to the hydraulic cement and protein additive.

24. The process of claim 16, further including adding 20 to 50 parts by weight mixing water to the hydraulic cement and protein additive.

* * * * *